United States Patent

[11] 3,598,903

[72] Inventors Robert A. Johnson;
Ray N. Steckenrider, both of Raleigh, N.C.
[21] Appl. No 735,019
[22] Filed June 6, 1968
[45] Patented Aug. 10, 1971
[73] Assignee International Business Machines Corporation
Armonk, N.Y.

[54] POSITION-IDENTIFYING DEVICE
5 Claims, 4 Drawing Figs.

[52] U.S. Cl. .......... 178/18
[51] Int. Cl. .......... G08c 21/00
[50] Field of Search .......... 340/347, 324, 324.1; 178/18, 19

[56] References Cited
UNITED STATES PATENTS
3,466,646 9/1969 Lewin .......... 340/347

OTHER REFERENCES
IBM Tech. Disclosure Bul. Vol. 3 No. 6 Nov., 1960
Hubby et al.; Scriptoscope Shows; Electronics July 1952

*Primary Examiner*—Kathleen H. Claffy
*Assistant Examiner*—Thomas L. Kundert
*Attorneys*—Hanifin and Jancin ABSTRACT: Orthogonally arranged horizontal and vertical loops in substantially the same plane are subjected to a narrow RF field radiating from a probe position within the loops at their intersections. Horizontal and vertical sense amplifiers connected to the horizontal and vertical loops respectively respond to the induced current in the loops and provide a detectable output at those amplifiers connected to the intersecting loops within which the probe is located for identifying the probe position.

INVENTORS
ROBERT A. JOHNSON
RAY N. STECKENRIDER

BY John B Frebone
ATTORNEY

POSITION-IDENTIFYING DEVICE

BACKGROUND OF THE INVENTION

1. Field of the Invention

The invention relates to position-identifying devices for use with displays for identifying locations on the display and more particularly to a position identifying device which utilizes a narrow RF field in proximity to the area on the display to be identified and which is detected by selected sense amplifiers to thereby identify the position of the RF field and thus the desired area on the display.

2. Description of the Prior Art

Electronically generated cathode ray tube and optical projection images have been finding increased usage as input devices for data processing systems. These are particularly useful since they increase man/machine communications ability. The graphic nature of the input devices reduces substantially the training requirements for the operator since the graphic display may contain instructional material.

The operator in systems of this type is presented a graphic image under control of the data processor and a response is generated when he identifies one or more specific areas on the image.

In the case of cathode-ray tube displays, a light sensitive device is enabled at the operator selected response point and the beam as it paints the image at that point is detected. The deflection circuits at that time contain positional data defining the beam location. This information is sent to the data processor which can tell what the response was since it is aware of the image content and the position of the light-sensitive device. The above technique has been used extensively since it is effective in most instances and is troublesome only in those instances where a dark screen area requires identification.

With a projected image, however, positional information is not available. Prior art techniques for identifying response locations involves generating nonvisible (i.e., red) light-scanning columns and detecting these with sensors. These systems require the generation of clock signals and counters for providing positional information. Thus, the counters are gated when the sensor detects the scanning columns and the counter value indicates the one or the other coordinate values of the sensor.

Systems employing invisible scanning light columns and sensors are entirely satisfactory in operation, however, they are costly to manufacture and require precise alignment once disturbed or otherwise subjected to mechanical shock or vibration.

SUMMARY OF THE INVENTION

The invention contemplates a device for providing positional information relative to an electromagnetic radiating probe when positioned in close proximity to selected locations on a surface and comprises, a first group of spaced substantially parallel elongated conductive loops, a second group of loops as set forth above arranged to intersect the first group of loops, said loops intersections defining a plurality of response areas on the said surface, a first group of sense amplifiers each responsive to one of the first group of loops for providing an output when the probe is bracketed by the connected loop, and a second group of sense amplifiers each responsive to one of the second group of loops for providing an output when the probe is bracketed by the connected loop whereby the probe position can be determined by the sense amplifier outputs when it is located within any of the response areas.

One object of this invention is to provide an electromagnetic detection system for deriving the positional data defining the physical locations of a probe which radiates electromagnetic energy detected by the system.

Another object of the invention is to provide a position-detecting system which is capable of operating under all ambient lighting conditions.

A further object of the invention is to provide a position-detecting system as set forth above which is suitable for use with a variety of different display devices.

Yet another object is to provide a position detection system as set forth above which is inexpensive to manufacture, reliable in operation and insensitive to mechanical shock or vibration.

A further object of the invention is to provide an electromagnetic detection system as set forth above which is capable of discriminating between a supervisory probe and an operator probe to provide unlimited response to the supervisory probe and limited response to the operator probe.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
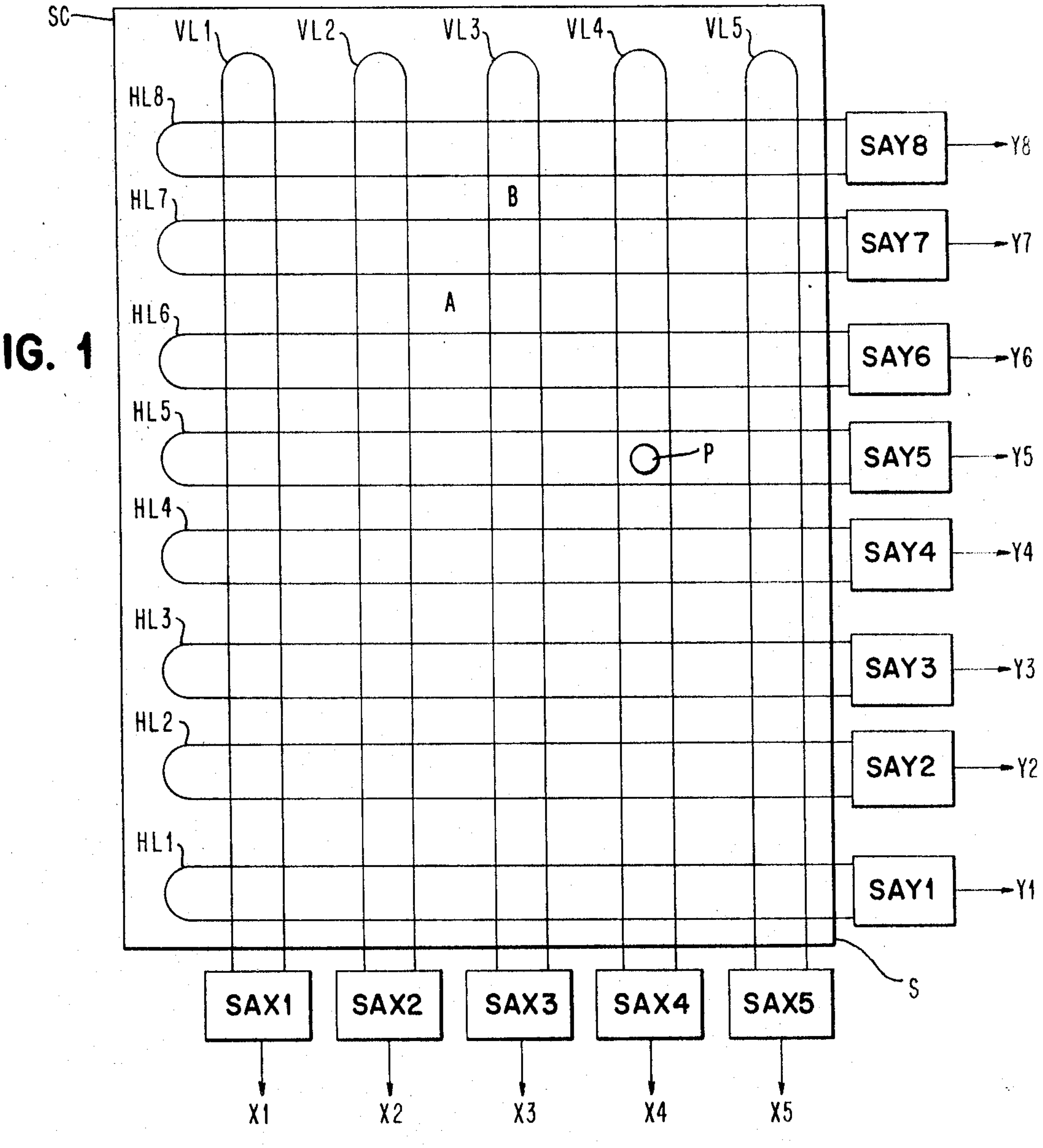
FIG. 1 is a block diagram of a novel position detection and signalling system constructed in accordance with the invention.

In FIG. 1, element SC represents schematically a ground glass viewing screen, the face of a cathode-ray tube or any other screen or device for displaying graphic information, a plurality of spaced elongated substantially parallel vertical conductive loops VL1—VL5 are supported within or in close proximity to the screen SC. A second group of similarly arranged horizontal loops HL1—HL8 are also supported in or in close proximity to the screen SC. The intersections of loops HL and VL are insulated from each other to provide physical isolation between loops HL and VL at the intersections.

Loop VL1 is connected to the inputs of a sense amplifier SAX1 which provides an output whenever a radiating probe is bracketed by the conductive loop. The field radiated by the probe induces currents in the loop which are sensed by amplifier SAX1. The field will only induce currents which can be sensed when its center is located within the loop and bracketed by the elongated conductive portion forming the loop. Loops VL2—VL5 are connected in a similar manner to sense amplifiers SAX2—SAX5, respectively. Horizontal loops HL1—HL8 are connected to sense amplifiers SAY1—SAY8 respectively. Sense amplifiers SAY1—SAY8 provide outputs Y1—Y8, respectively, while sense amplifiers SAX1—SAX5 provide outputs XI—X5, respectively.

Sense amplifiers SAY1—SAY8 provide information with respect to the location of the probe in the vertical direction along the Y-axis. Thus, if the probe is located at position P, amplifier SAY5 provides an output indicating that the vertical position of the probe is at coordinate Y5. Likewise, amplifiers SAX1—SAX5 provide information relative to a location of the probe along the X-axis. Thus, if the probe is located at the position P, amplifier SAX4 provides information indicating that the probe is at coordinate X4 along the X-axis. If the probe is located at the intersections of two loops, outputs are provided from both amplifiers SAX and SAY indicating the precise coordinates of the probe. However, if the probe is located at position A as indicated in the drawing, it is not bracketed by any of the loops thus no information is provided by any of the amplifiers. If the probe is located at position B as indicated in the drawings, amplifier SAX3 will provide information relative to the probe since the probe is located within loop VL3 and thus is bracketed by the conductor forming the loop. However, in this instance, no information is provided relative to the Y-axis and a valid response requires that both a Y and X indication be provided. With the arrangement illustrated in FIG. 1, the areas defined by the intersections of the loops are the only valid response areas if both an X and Y indication are required thus this circuit provides means for detecting the location of probe P in any one of forty areas defined by the intersections of the loops VL and HL.

The loops may be uniformly spaced, close together or widely separated, or nonuniformly spaced to provide selective response areas on the screen. The arrangement of the loops will be determined by the use to which the particular detection device is to be put.

With this arrangement, areas for printed information may be reserved within which no responses are permitted by simply spacing the loops as desired to display this information. This arrangement provides a programmer unlimited flexibility for limiting responses to selected areas and reserving areas for printed matter on the display screen.

Figure 2:
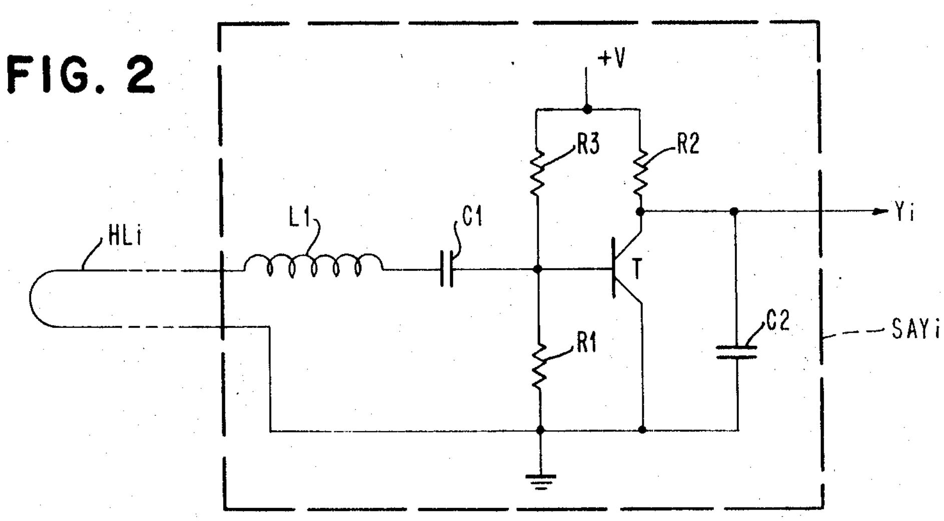
FIG. 2 is a schematic diagram of a sense amplifier shown in block form in FIG. 1.

In FIG. 2, a single loop HL*i* is connected to sense amplifier SAY*i* which provides an output on conductor Y*i* when the probe is located within or bracketed by the conductor forming loop HL*i*. When the probe is in this position, it induces currents in both sides of the elongated loop which are additive and of sufficient magnitude to be detected by the sense amplifier SAY*i*. Sense amplifier SAY*i* includes an inductor L1 in series with a capacitor C1 which couples one side of the loop to the base of a transistor T. The other side of the loop is grounded and connected to the emitter of transistor T. Inductor L1 and capacitor C1 are chosen so they are resonant at the frequency of the electromagnetic radiation of probe T. A voltage divider network formed of series connected resistors R1 and R3 between a source +V and ground provides base bias for transistor T. The collector of transistor T is connected to the bias source +V by a load resistor R2 and a capacitor C2 connected between the collector of transistor T and ground provides filtering of the output from the sense amplifier so that a logic level voltage is provided on conductor Y*i*.

Stray electromagnetic fields have little or no effect on sense amplifier SAY*i*. Since the loop HL*i* is elongated, the currents induced in the parallel portions of the loop are not additive, thus the input signal to the base of the transistor T of the sense amplifier SAY*i* is insufficient even when properly phased to turn it on. Furthermore, tuned circuit L1C1 is in all probability tuned to a different frequency. Thus, stray fields have little or no effect and the probe when outside of the loop HL*i*, that is, not between the two elongated portions of the loop has little or no effect even though of the same frequency as the tuned circuit L1C1.

Figure 3:
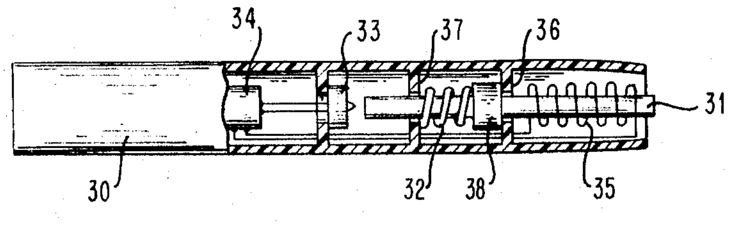
FIG. 3 is a schematic electromechanical drawing illustrating the construction of a radiating probe.

Probe P shown in greater detail in FIG. 3 includes a body portion 30, a moveable switch actuator 31 which is biased to an inoperative position by a spring 32. When the actuator 31 is brought into physical contact with the screen SC, it moves against spring 32 and closes the contacts of a switch 33 completing a circuit for energizing a radio frequency oscillator 34 which is connected to a coil 35 which provides the alternating field that induces the current previously described. A radial flange 36 extending from the body 30 retains switch actuator 31 within the body 30 and another radial flange 37 extending from body 30, anchors spring 32 which urges switch actuator 31 into the inoperative position. A circumferential enlargement 38 on switch actuator 31 engages flange 36 which retains the actuator 31 within body 30.

Figure 4:
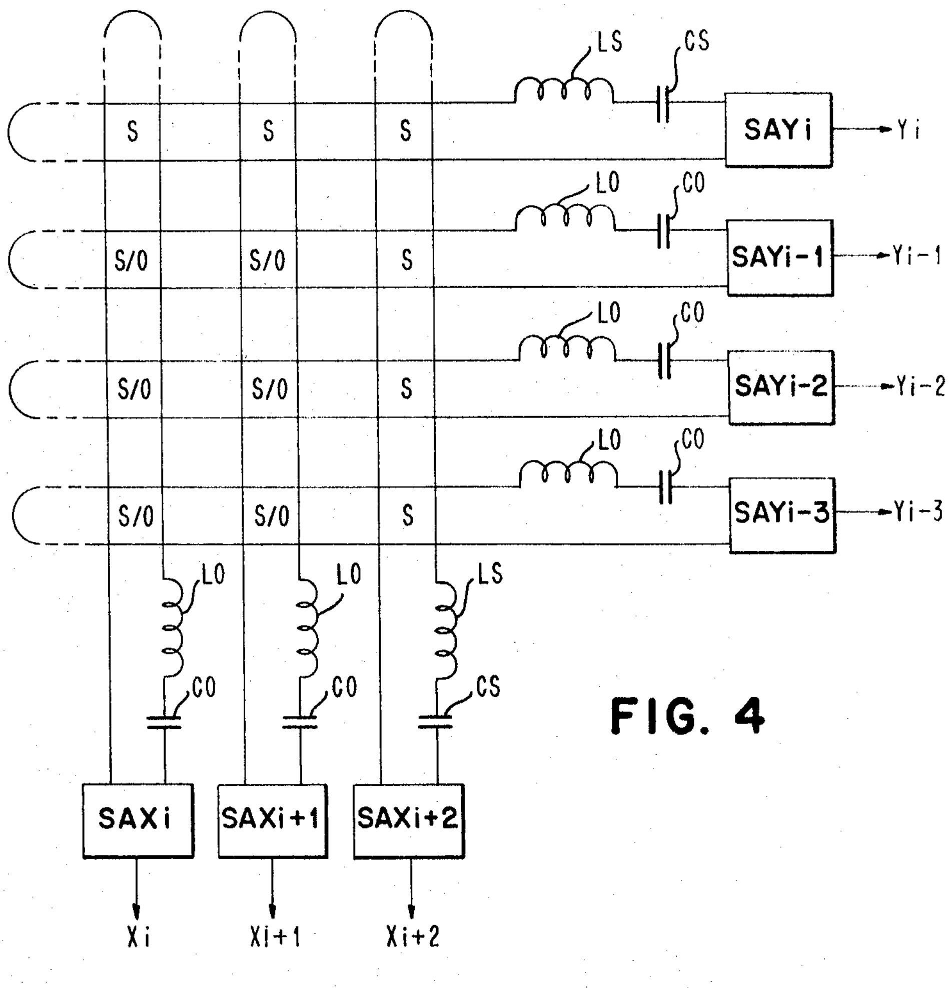
FIG. 4 is a block diagram illustrating how the circuit shown in FIG. 1 can be utilized for detecting unlimited supervisory probe responses and limited operator probe responses.

The circuit illustrated in FIG. 4 is identical in all respects to the circuit previously described and shown in FIGS. 1 and 2. However the values of L1 and C1 may be altered to provide exclusive responses at all response points for a supervisory probe and limited responses for an operator probe. Inductor capacitor pairs L/C may be turned to one of two different frequencies designated supervisory frequency (LS/CS) and operator frequency (LO/CO). Thus, if responses to a supervisory frequency only is desired at any given Y-coordinate, the sense amplifier connected to the loop H*i* at that coordinate is tuned to the supervisory frequency (LS/CS). If operator and supervisory responses are desired at some Y-coordinate Y*i*–1, the sense amplifier connected to the loop HL*i*–1 is tuned to the operator frequency (LO/CO). The supervisor's probe is provided with two oscillators which provide radio frequency electromagnetic radiation at both frequencies. Whereas the operator's probe is provided with only one oscillator which provides radio frequency electromagnetic radiation at the operator frequency.

With the arrangement illustrated in FIG. 4, the supervisor's probe may detected at any of the response points as indicated by the S at each response point since his probe radiates both the supervisory and operator frequency. The operator probe may be detected at selective points where in O is inserted since his probe only radiates the operator frequency. The above detection system is of course predicated on the fact that a valid detection can only occur when one horizontal and one vertical amplifier detect radiation.

The above described capability is extremely useful where an operator may insert decisions into a computer system by way of a display panel and his decision or authority is limited, however, supervisors or other personnel so designated may insert information or commands at any response point. The availability of probes provided with the dual frequency radiation would be under control of the system management which would be responsible for security and proper use of the supervisory and operator probes.

A variant of the FIG. 4 arrangement may be employed to achieve the same result. According to the variant, the supervisor and operator probes each radiate a single unique frequency and selected sense amplifiers are turned to both frequencies thus responding to both the supervisor and operator probes. The remaining amplifiers are tuned to the supervisor frequency only.

While the invention has been particularly shown and described with reference to a preferred embodiment thereof. It will be understood by those skilled in the art that various changes in form and details may be made therein without departing from the spirit and scope of the invention.

What we claim is:

1. A device for providing positional information relative to an electromagnetic radiating probe when positioned in close proximity to selected locations on a surface comprising:
   - a first group of spaced electrically independent conductive loops located in a single layer in close proximity to said surface,
   - a second group of spaced located in a single conductive loops layer in close proximity to said surface and arranged to intersect the first group of loops, said intersections defining a plurality of unique response areas in the said surface,
   - a first group of sense amplifiers each responsive to one of the loops in the first group of loops for providing an output when the probe is bracketed by the connected loop, and
   - a second group of sense amplifiers each responsive to one of the loops in the second group of loops for providing an output when the probe is bracketed by the connected loop whereby the probe position can be determined by the sense amplifier outputs when it is located within any of the unique response areas defined by the intersecting loops.

2. A device as set forth in claim 1 in which the loops of the first and second groups are arranged substantially orthogonal to each other and the response areas defined by the intersections of the loops are substantially rectangular in shape.

3. A device as set forth in claim 2 in which the loops of the first and second groups are elongated and are each substantially longer in one direction than the other.

4. A device as set forth in claim 3 in which the sense amplifiers of the first and second groups are tuned to the probe frequency and reject other frequencies.

5. A device as set forth in claim 1 in which the first group of loops are horizontally arranged and the second group of loops are vertically arranged.